US005853892A

United States Patent [19]

Chen et al.

[11] Patent Number: 5,853,892

[45] Date of Patent: *Dec. 29, 1998

[54] AMORPHOUS FLUOROPOLYMER COATED FUSING BELT

[75] Inventors: Jiann Hsing Chen, Fairport; Lawrence Paul Demejo, Rochester; Gary Frederick Roberts, Macedon; Muhammed Aslam, Rochester, all of N.Y.

[73] Assignee: Eastman Kodak Company, Rochester, N.Y.

[ * ] Notice: The term of this patent shall not extend beyond the expiration date of Pat. No. 5,720,703.

[21] Appl. No.: 672,250

[22] Filed: Jun. 28, 1996

[51] Int. Cl.[6] .......... B32B 15/08; B32B 27/08; B32B 27/34; B32B 27/36

[52] U.S. Cl. .......... 428/421; 526/242; 526/247; 430/97; 430/99; 430/124

[58] Field of Search .......... 428/421, 422, 428/35.7, 35.8, 36.9, 36.91; 526/242, 247; 430/97, 99, 124, 48, 939

[56] References Cited

U.S. PATENT DOCUMENTS

| | | | |
|---|---|---|---|
| 4,948,851 | 8/1990 | Squire | 526/247 |
| 5,006,382 | 4/1991 | Squire | 428/35.7 |
| 5,035,950 | 7/1991 | DelRosario | 428/421 |
| 5,256,507 | 10/1993 | Aslam et al. | 430/42 |
| 5,411,779 | 5/1995 | Nakajima et al. | 428/36.91 |
| 5,493,378 | 2/1996 | Jamzadeh et al. | 355/285 |

FOREIGN PATENT DOCUMENTS

| | | |
|---|---|---|
| 63/300254 | 12/1988 | Japan . |

*Primary Examiner*—Vivian Chen

*Attorney, Agent, or Firm*—John R. Everett

[57] ABSTRACT

A fuser belt comprising an amorphous fluoropolymer outer layer for fusing a thermoplastic resin toner image to a substrate produces high gloss images, wherein the amorphous fluoropolymer has the structure:

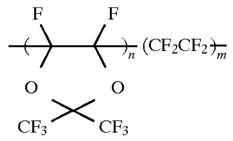

in which m is 20 mole percent or 35 mole percent and n is 65 mole percent or 80 mole percent.

3 Claims, 1 Drawing Sheet

AMORPHOUS FLUOROPOLYMER COATED FUSING BELT

RELATED APPLICATIONS

The present case relates to the following U.S. patent applications filed at the same time as the present application:

U.S. patent application Ser. No. 08/673,448, filed 28 Jun. 1996, U.S. Pat. No. 5,709,973 entitled Process for Controlling Gloss in Electrostatic Images" filed in the name of Chen et al.

U.S. patent application Ser. No. 08/674,227, filed 28 Jun. 1996 (U.S. Pat. No. 5,678,154) entitled "Transparency Feed with Amorphous Fluoropolymer Coated Pressure Roll" filed in the name of Chen et al.

FIELD OF THE INVENTION

This invention relates to electrostatographic imaging.

BACKGROUND OF THE INVENTION

In electrostatography an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photoinduced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical foundation of an electrostatic field pattern on a surface of dielectric material). Typically, the electrostatic field pattern is developed into an electrostatographic toner pattern by contacting the field pattern with an electrostatographic developer containing an electrostatographic toner. If desired, the latent electrostatic field pattern can be transferred to another surface before such development. Although such techniques are typically used for black and white reproduction such as copying business correspondence, they are capable of forming a variety of single color or multicolor toned images.

A typical method of making a multicolor copy involves trichromatic color synthesis is subtractive color formation. In such synthesis successive latent electrostatic images are formed on a substrate, each representing a different color, and each image is developed with a toner of a different color and is transferred to a support (receiver). Typically, but not necessarily, the images will correspond to each of the three primary subtractive colors (cyan, magenta and yellow), and black as a fourth color, if desired. For example, light reflected from a color photograph to be copied can be passed through a filter before impinging on a charged photoconductive layer so that the latent electrostatic image on the photoconductive layer corresponds to the presence of yellow in the photograph. That latent image can be developed with a yellow toner and the developed image can be transferred to a support. Light reflected from the photograph can then be passed through another filter to form a latent electrostatic image on the photoconductive layer which corresponds to the presence of magenta in the photograph, and that latent image can then be developed with a magenta toner and transferred to the same support. The process can be repeated for cyan (and black, if desired).

It is known to use toner fusing processes to provide toner images having certain enhanced characteristics. For example, Japanese Patent Kokai No. 88/300,254, describes a process for preparing documents using direct digital printing and under color removal techniques to provide documents having full-color images in which a first portion, for example text, exhibits a low gloss or matte appearance and a second portion, for example a drawing, exhibits high gloss in relation to the first portion. This Japanese application indicates that such gloss differential presents a pleasing appearance to a viewer.

The process described in Japanese Application Number 88/300,254 involves (1) first forming on a support a toner image using a black toner having a loss tangent (tan $\delta$) in the range of 1.30 to 1.60 at a storage elastic modulus (G') of $10^5$ dyne/cm$^2$, (2) forming on the same support a toner image using three primary subtractive color toners having a loss tangent (tan $\delta$) in the range of 1.70 to 3.00 at a storage elastic modulus (G') of $10^5$ dyne/cm$^2$ and (3) fixing the images using a heated fuser roll. The Japanese application indicates that the aforementioned loss tangent ranges are critical to obtaining acceptable fused toner images having the required differential gloss and presents comparative data to illustrate this point.

The process described in Japanese Application No. 88/300,254 is adequate to provide gloss differential between toner images that form a fused toner pattern on a support. It is not, however, as flexible a process as would be desired to provide larger differences in gloss for a much greater variety of colored toners, as would be evidenced by lower loss tangents for black toners and higher loss tangents for subtractive color toners, as described in that application.

U.S. Pat. No. 5,411,779 discloses a composite tubular article for use as a fixing belt for fixing thermal images. The tubular article comprises a tubular inner layer made of a polyamide resin and a tubular outer layer made of a fluoroplastic. The fluoroplastic layer has a specified surface roughness to provide a matte finish to fixed thermal images. Examples of the fluoroplastic include commercially available polytetrafluoroethylene resins (PTFE), tetrafluoroethylene/hexafluoropropylene copolymer resins (FEP), tetrafluoroethylene/perfluoroalkyl vinyl ether copolymer resins (PFA), and the like. The latter fluoroplastic materials are semicrystalline. As such they are incapable of forming optically clear smooth surfaces that are required for photographic quality print finishing.

It would be desirable to provide a means capable of forming optically clear smooth surfaces for photographic quality print finishing.

SUMMARY OF THE INVENTION

Figure 1:
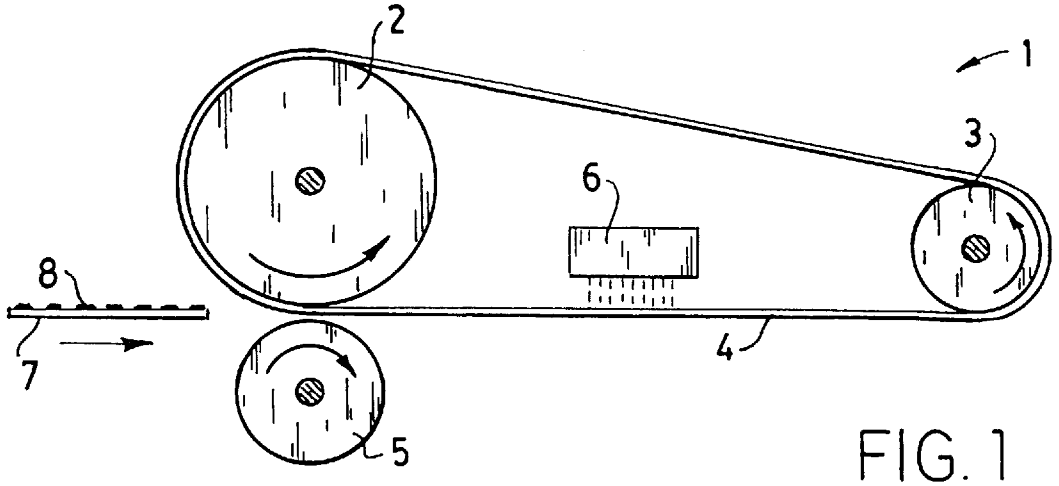
FIG. 1 is a schematic illustration of an apparatus suitable for carrying out the method of this invention.

The present invention provides a fuser belt having an amorphous fluoropolymer outer layer for fusing a thermoplastic resin toner image to a substrate.

The above fusing belt makes possible a process imparting high gloss to fused toner images, comprising the steps of:

A. passing an element bearing an unfused toner image through a fusing zone, a cooling zone and a release zone; and B. bringing the element bearing the unfused toner image into pressure contact with a fusing belt, thereby fusing the toner image to the element; characterized in that the fusing belt has an outer coating of an amorphous fluoropolymer.

The present invention provides images having the higher gloss required for photographic quality images. The invention also provides fuser belt coatings that require lower sintering temperature conditions than semicrystalline fluoropolymers. One is also able to obtain smoother coatings compared to semicrystalline fluoropolymers.

DETAILED OF THE INVENTION

Amorphous fluoropolymers according to structure 1 above are available from E.I. Dupont with glass transition temperatures at 160° C. (Teflon AF 1600) or 240° C. (Teflon 2400). They have the structure:

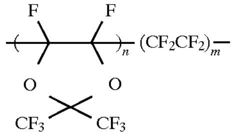

wherein m is 20 mole percent or 35 mole percent and n is 65 mole percent or 80 mole percent. These materials have unusual properties such as low surface energy, low moisture absorption and solution coating capability.

The unfixed or unfused toner pattern that is fused in the method of the invention comprises toner images that can be generated using any electrostatographic image-forming process capable of providing toner images. Such patterns can comprise line copy, continuous tone images and half-tone images as well as combinations thereof. The toner images forming the pattern can be conveniently generated using electrostatographic processes of the type described previously, including four-color toner images prepared using digital four-color, full-color printers.

FIG. 1 illustrates a useful apparatus suitable for fusing or fixing an electrostatographic toner pattern to achieve the high gloss provided by this invention.

FIG. 1 depicts a fusing device 1 for providing fused toner images in a fused toner pattern which images exhibit a different level of gloss. Device 1 comprises a heating roll 2, a roll 3 spaced from the heating roll 2, a fusing belt 4 which is trained about heating roll 2 and roll 3 as an endless or continuous metal web or belt 4 which is conveyed in a counterclockwise direction, as viewed in FIG. 1, upon rotation of the heating roll 2 and roll 3. Backup or pressure roll 5 is biased against the heating roll 2 and the continuous belt 4 is cooled by impinging air provided by blower 6. In operation, support 7 bearing the unfused toner pattern 8 is transported in the direction of the arrow into the nip between heating roll 2 and backup or pressure roll 5 which can be heated if desired, where it enters a fusing zone extending about 2.5 cm laterally along continuous belt 4. Following fusing in the fusing zone, the fused image pattern then continues along the path belt 4 and into the cooling zone about 5 to 25 cm in length in the region following the nip between heating roll 2 and pressure roll 5. Upon exiting the fusing zone, belt 4 is cooled in a controlled manner by air that is caused to impinge upon belt 4 by blower 6. The fused toner image pattern on support 7 then exits the cooling zone and separates from belt 4 as the belt passed around roll 3 and is transported to copy collection means such as a tray (not shown). Support 7 bearing the fused image pattern is separated from the fusing belt within the release zone at a temperature where no toner image offset occurs. This separation is expedited by using a roll 3 of relatively small diameter e.g. a diameter of about 2.5 to 4 cm. As a result of passing through the three distinct zones, i.e. the fusing zone, cooling zone and release zone, the fused toner images in the fused image pattern exhibit different levels of gloss which are normally readily perceptible to the unaided eye. The extent of each of the three zones and the duration of time the toner pattern resides in each zone can be conveniently controlled simply by adjusting the velocity or speed of belt 4. The velocity of the belt in a specific situation will depend upon several variables, including, for example, the temperature of the belt, the fusing zone, the temperature of the cooling air and the composition of the toner particles.

The fuser belt is manufactured from polyamide, polyimide, polyester, polycarbonate, steel, stainless steel, nickel or aluminum.

Fusible toner particles used in this invention can have fusing temperatures of less than about 200° C., often less than 100° C. so they can readily be fused to papers sheets, even resin coated paper sheets without deformation (blistering) of the resin coating. Of course, if the toner images are fused to supports which can withstand higher temperatures, toner particles of higher fusing temperatures can be used.

Numerous colorant materials selected from dyestuffs or pigments can be employed in the toner particles used in the invention. Such materials serve to color the toner and/or render it more visible. Suitable toners can be prepared without the use of a colorant material where it is desired to have developed toner image of low optical densities and different gloss levels. In those instances where it is desired to utilize a colorant, the colorants can, in principle, be selected from virtually any of the compounds mentioned in the Colour Index Volumes 1 and 2, Second Edition, Included among the vast number of useful colorants are those dyes and/or pigments that are typically employed as blue, green, red and yellow colorants used in electrostatographic toners to make color copies. Suitable colorants also include those typically employed in primary substrative cyan, magenta and yellow colored toners. Examples of useful colorants are Hansa Yellow G (C.I. 11680) C.I. Yellow 12, C.I. Solvent Yellow 16, C.I. Disperse Yellow 33, Nigrosine Spirit soluble (C.I. 50415), Chromogen Black ETOO (C.I. 45170), Solvent Black 3 (C.I. 26150), Fuchsine N (C.I. 42510) C.I. Pigment Red 22, C.I. Solvent Red 19, C.I. Basic Blue 9 (C.I. 52015) and Pigment Blue 15. Carbon black also provides a useful colorant. The amount of colorant added may vary over a wide range, for example, from about 1 to 20 percent of the weight of binder polymer used in the toner particles. Good results are obtained when the amount is from about 1 to 10 percent.

Charge control agents suitable for use in toners are disclosed fro example in U.S. Pat. Nos. 3,893,935; 4,079,014; 4,323,634 and British Patent Nos. 1,501,065 and 1,420,839. Charge control agents are generally employed in small quantities such as, about 0.1 to 3 weight percent, often about 0.2 to 1.5 weight percent, based on the weight of toner.

Toner images fused according to this invention can be formed from electrostatographic developers comprising toner particles that are mixed with a carrier vehicle. Carrier vehicles which can be used to form suitable developer compositions, can be selected from a variety of materials. Such materials include carrier core particles and core particles overcoated with a thin layer of film-forming resin. Examples of suitable resins are described in U.S. Pat. Nos. 3,547,822; 3,632,512; 3,795,618; 3,898,170; 4,545,060; 4,478,925 4,076,857; and 3,970,571.

The carrier core particles can comprise conductive, non-conductive, magnetic, or non-magnetic materials. See, for example, U.S. Pat. Nos. 3,850,663 and 3,970,571. Especially useful in magnetic brush development schemes are iron particles such as porous iron. Particles having oxidized surfaces, steel particles, and other "hard" or "soft" ferromagnetic materials such as gamma ferric oxides or ferrites, such as ferrites of barium, strontium, lead, magnesium, or aluminum. See for example, U.S. Pat. Nos. 4,042,518; 4,478,925; and 4,546,060.

A typical developer composition containing toner particles and carrier vehicle generally comprises about 1 to 20 percent, by weight, of particulate toner particles and from 80 to 99 percent, by weight, carrier particles. Usually, the carrier particles are larger than the toner particles. Conventional carrier particles have a particle size on the order of about 20 to 1200 micrometers. generally about 30 to 300 micrometers. Alternatively, the toners can be used in a single component developer, i.e., with no carrier particles.

The toner and developer compositions described in the previous paragraphs can be used in a variety of ways to develop electrostatic charge patterns to provide the electrostatographic toner patterns that can be fused by the method of this invention. Such developable charge patterns can be prepared by a number of means can be carried for example, on a light sensitive photoconductive element or a non-light sensitive dielectric-surfaced element such as an insulator-coated conductive sheet. One suitable development technique involves cascading the developer composition across the electrostatic charge pattern, while another technique involves applying toner particles from a magnetic brush. This latter technique involves the use of a magnetically attractable carrier vehicle in forming the developer composition. After image wise deposition of the toner particles to form an electrostatographic toner pattern, the pattern can be fixed or fused by the method of this invention to the support carrying the pattern. If desired, the unfused toner pattern can be transferred to a support such as a blank sheet of copy paper and then fused by the method of this invention to form a permanent image pattern.

Typical toner particles generally have an average particle size in the range of about 0.1 to 100 micrometers, a size of about 2 to 15 micrometers being particularly useful in the practice of this invention to form high resolution images.

In the method of this invention the toner image pattern is brought into pressure contact with the surface of the fusing belt in the fusing zone. The temperature applied to fuse the toner particles causes the particles to fuse into a sintered mass which adheres to the support. Upon cooling in the cooling zone while in contact with the fusing belt, the toner images achieve a gloss level dependent upon the fluoropolymer coating options provided by the invention. Typical temperatures used in the fusing zone are less than about 140° C., generally in the range of about 100° C. to 140° C., often 105° C. to 135° C. and preferably 115° C. to 130° C. The pressure used in this invention in combination with the aforementioned fusing temperature include those conventionally employed in contact fusing processes in the prior art. They are generally in the range of about 3 kg/cm$^2$ to 15 kg/cm$^2$ and often about 10 kg/cm$^2$. As indicated in FIG. 1, such pressure is conveniently applied using a roll, although any suitable pressure means known to those skilled in the art could be used.

The fusing belt of this invention is the continuous metal belt 4 indicated in FIG. 1. The surface of the fusing belt is smooth. The continuous belt is reasonably flexible and also heat resistant. Release agents, for example, polymeric release oils such as polydiorganosiloxane release oils can be used. Belt 4 enters the fusing zone at a velocity of at least about 2.5 cm/sec., typically about 2.5 to 10 cm/sec. The velocity is generally kept constant as the element bearing the toner pattern moves through the cooling and release zones.

In the cooling zone, cooling of the fused toner pattern is controlled so that it can be released at a temperature where no toner image offset occurs. The temperature of the fused image pattern is generally reduced at least about 40° C., often about 65° to 90° C. in the cooling zone. As previously indicated herein, controlling the velocity of the fusing belt, for example, the velocity of a continuous belt. When a continuous belt is used as the fusing belt, it usually is not necessary to press the element against the fusing belt to maintain contact between the fusing belt and the toner image pattern because the toner image pattern is heated in the fusing zone to a point where the fused pattern surface acts as an adhesive which temporarily bonds it to the fusing belt as the fused toner pattern moves through the cooling zone.

In the release zone the fused toner pattern is separated from the fusing belt. Such release is not effected until the fusing belt is cooled to a temperature where no toner image offset occurs. Such temperature is typically no more than about 75° C. and is normally in the range of about 30° C. to 60° C. The specific temperature used to achieve such separation will vary considerably as it depends upon the flow properties of the toner particles. The release temperature chosen is such that the toner image exhibits a significant elastic characteristic and adheres to the support and exhibits sufficient cohesiveness such that it will not offset on the fusing belt at the particular temperature used.

The invention is further illustrated by the following examples, 1–3.

EXAMPLE 1

Two amorphous teflon coatings (Teflon AF 1600 and Teflon AF 2400) were blade coated from 3% and 2% solutions respectively onto 3 mil (0.0762 mm) stainless steel and, in the case of Teflon AF 1600, also onto 2 mil (0.0508 mm) electroformed nickel. A silicone thermoset coating was also blade coated from a 40% solution onto 3 mil (0.0762 mm) stainless steel for comparison to the other coatings.

The (1) thickness, (2) surface tension, (3) room temperature wear resistance (measured with a Norman abrader) and (4) release properties of the fuser belt coating using styrene butyl acrylate (SBA) and polyester (PES) toned images were evaluated. The release properties were measured on a device similar to the Ektaprint 250 fuser assembly. These measurements are reported in Table 1.

TABLE 1

| Coating | Thickness (microns) | Surface Tension (dyne/cm) | Wear 10 cycles | Wear 25 cycles | Offline Release (SBA) | Offline Release (PES) |
|---|---|---|---|---|---|---|
| Teflon AF 1600 steel | 6.5 | 12 | no | no | yes | yes |
| Teflon AF 1600 nickel | 6.8 | 13 | no | no | yes | yes |
| Teflon AF 2400 steel | 4.4 | 12 | no | yes | yes | yes |
| silicone on steel | 3.8 | 20 | no | yes | yes | yes |

The above data shows that the invention achieves thicker surface coatings than prior art silicone coatings. The coatings were observed to be crack free. Similarly thick thermoset silicone coatings exhibited cracks. Moreover, these thicker coatings lead to wear improvements.

EXAMPLE 2

Fusing belts were prepared as follows. Three 3 mil (0.0762 mm) thick, 40 inches (101.6 cm) long and 13" (33 cm) wide seamless electroformed nickel belts (A, B, and C) were coated with Teflon AF 1600 and Teflon AF 2400. For comparison purposes a 3 mil (0.0762 mm) thick, 30 inches (76.2 cm) long and 10 inches (5.4 cm) wide seamed stainless steel belt (D) was coated with Teflon AF 1600.

All the belts were wiped with dichloromethane followed by acetone and isopropyl alcohol and then allowed to air dry.

Belt A was ring coated with a 1% solution of Teflon AF 2400 in FC 75 (3M Company) (70 cps viscosity) and then allowed to air dry. The coated belt was cured in a forced air oven by ramping the temperature from ambient to 110° C. over a period of 1 hour, held at 110° C. for 2 hours then the temperature was ramped to 250° C. over a 30 minute period and held at 250° C. for 5 minutes. The Teflon AF 2400 dry coating thickness was approximately 1 μm.

Belt B was ring coated with a 2% solution of Teflon AF 1600 in FC 75 and then allowed to air dry. The coated belt was cured in a forced air oven by ramping the temperature from ambient to 110° C. over a period of 1 hour, held at 110° C. for 2 hours then the temperature was ramped to 170° C. over a 30 minute period and held at 170° C. for 5 minutes. The Teflon AF 1600 dry coating thickness was approximately 1.5 μm.

Belt C was primed with a solution consisting of 1 gram of A0700, 1 gram of ethanol, 0.2 grams of distilled water and 46 grams of methylethylketone. The primer was wiped on the belt surface with a cotton pad, the excess was buffed off and the primed belt was allowed to air dry. A 2.5% solution of Teflon AF 1600 in FC 75 was ring coated over the primed surface and then allowed to air dry. The curing conditions for belt C were identical to the conditions used for belt B. The Teflon AF 1600 dry coating thickness was approximately 2 μm.

Belt D was ring coated with a 2.5% solution of Teflon AF 1600 in FC 75 and then allowed to air dry. The curing conditions for belt D were identical to those used for belts B and C. The Teflon AF 1600 dry coating thickness was approximately 2 μm.

These thus prepared fusing belts were mounted in a device according to FIG. 1 and run at a 270° F. (132.2° C.) fusing temperature and 110° F.–115° F. (43.3°–46.1° C.) release temperature against a pressure roll at a nip load of approximately 90 pounds/linear inch (16 kg/cm). Fusing speed was 1.3 in/sec (3.3 cm/sec). Blank sheets of Pliotone/Piccotex (Goodyear) (70/30) coated receiver were used. Toned receivers were interspersed at 200 blank receiver intervals. All the life tests were terminated after the appearance of localized areas of coating delamination on the fuser belt. The life test results are summarized in Table 2.

TABLE 2

| Belt | Substrate | Coating | Thickness (microns) | Life (# of prints) |
|---|---|---|---|---|
| A | nickel | Teflon AF 2400 | 1 | 3 |
| B | nickel | Teflon AF 1600 | 1.5 | 110 |
| C | primed nickel | Teflon AF 1600 | 2 | 350 |
| D | stainless steel | Teflon AF 1600 | 2 | 1300 |

Table 2 shows that Teflon AF 1600 coated on stainless steel has greater life than Teflon AF 1600 or 2400 coated on nickel.

EXAMPLE 3

Gloss measurement of Teflon AF vs semicrystalline Teflon

Two amorphous Teflon coatings, Teflon AF 1600 and Teflon AF 2400, were blade coated from 6% and 2% solutions respectively onto 3 mil (0.0762 mm) stainless steel. The coatings were cured following the conditions used in Example 2.

In addition, the stainless steel shims were primed with Dupont phosphoric acid primer 958–200. Perfluoroalkoxy-tetrafluoroethylene (PFA) 857–200 and Fluorinated Ethylene Propylene (FEP) were spray coated over the primed shims separately and both were cured at 20 minutes at 700 F. (371.1° C.). The total coating thickness was about 50 μm.

The cured coatings were then cut into appropriate sizes for the G-20 gloss measurement and the fusing /release tests. The gloss levels were measured at a 20° angle using a Micro-TRI-gloss meter manufactured by BYK-Gardner in Silver Springs, Md. The method for measurement is described in ASTM-523.

The tests were performed on the EK-250 fusing breadboard. The nip load for the 20 mil (0.102 mm) EC-4952 red rubber overcoated pressure roll against 100 mil EC-4952 red rubber fusing belt is 5–10 kg/cm$^2$. Fusing speed was 2.54 cm per second. The coated shims were mounted on the heated fusing roll and ran against toned color images which were electrostatically developed with Ricoh 5002 toner on clay coated paper. The fusing temperature was 125° C. and release temperature was 50° C.

The G-20 gloss data are presented in Table 3 below.

TABLE 3

| Coating | G-20 for coating | G-20 for fused image |
|---|---|---|
| Teflon AF 1600 | 157 | 45 |
| Teflon AF 2400 | 178 | 33 |
| PFA | 8 | 7 |
| FEP | 16 | 16 |

Example 3, together with Table 3, show that amorphous fluorocarbons provide greater gloss at a lower sintering temperature compared to semicrystalline fluorocarbons.

The invention has been described in detail with particular reference to a preferred embodiment thereof. However it will be understood that variations and modifications can be effected within the spirit and scope of the invention as described hereinabove and defined in the appended claims.

We claim:

1. A fuser belt having an amorphous fluoropolymer outer layer for fusing a thermoplastic resin toner image to a substrate wherein the amorphous fluoropolymer has the structure:

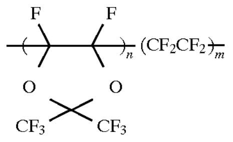

in which m is 20 mole percent or 35 mole percent and n is 65 mole percent or 80 mole percent.

2. The fusing belt of claim 1 wherein the belt is selected from the group consisting of polyamide, polyimide, polyester, polycarbonate, steel, stainless steel, nickel and aluminum.

3. A process for imparting gloss to fused toner images, comprising the steps of:

A. passing an element bearing an unfused toner image through a fusing zone, a cooling zone and a release zone; and B. bringing the element bearing the unfused toner image into pressure contact with a fusing belt, thereby fusing the toner image to the element; characterized in that the fusing belt has an outer coating of an amorphous fluoropolymer having the structure:

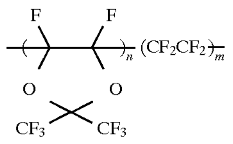

in which m is 20 mole percent or 35 mole percent and n is 65 mole percent or 80 mole percent.

* * * * *